Sept. 4, 1923. 1,467,222
F. E. ASELTINE
METHOD AND MEANS FOR INCORPORATING AN ANTIKNOCK SUBSTANCE
WITH A MOTOR FUEL MIXTURE
Filed Dec. 17, 1920 2 Sheets-Sheet 1
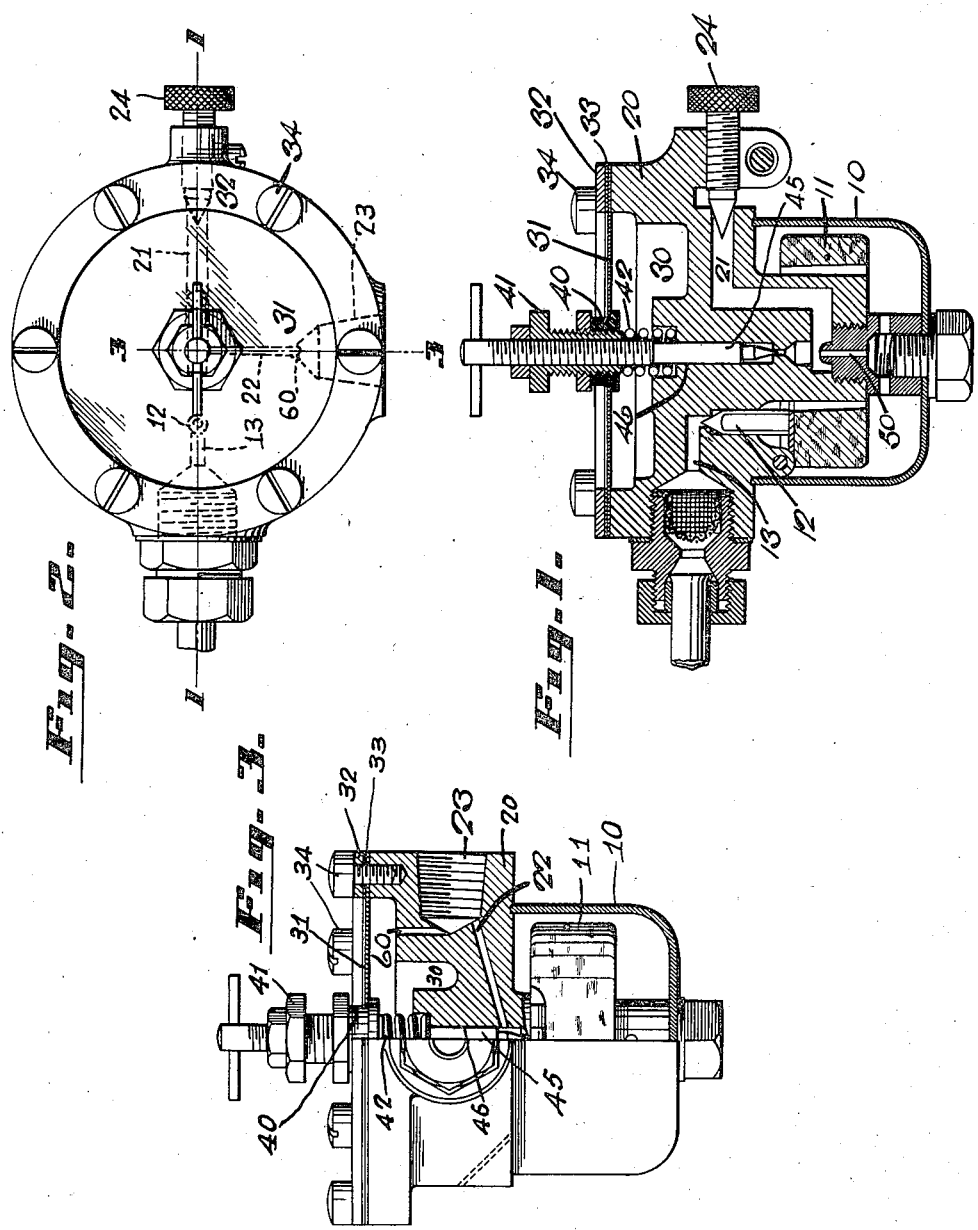

Sept. 4, 1923. 1,467,222
F. E. ASELTINE
METHOD AND MEANS FOR INCORPORATING AN ANTIKNOCK SUBSTANCE
WITH A MOTOR FUEL MIXTURE
Filed Dec. 17, 1920 2 Sheets-Sheet 2

Patented Sept. 4, 1923.

1,467,222

UNITED STATES PATENT OFFICE.

FRED E. ASELTINE, OF DAYTON, OHIO, ASSIGNOR TO GENERAL MOTORS RESEARCH CORPORATION, OF DAYTON, OHIO, A CORPORATION OF DELAWARE.

METHOD AND MEANS FOR INCORPORATING AN ANTIKNOCK SUBSTANCE WITH A MOTOR-FUEL MIXTURE.

Application filed December 17, 1920. Serial No. 431,528.

*To all whom it may concern:*

Be it known that I, FRED E. ASELTINE, a citizen of the United States of America, residing at Dayton, county of Montgomery, and State of Ohio, have invented certain new and useful Improvements in Methods and Means for Incorporating an Antiknock Substance with a Motor-Fuel Mixture, of which the following is a full, clear, and exact description.

This invention relates to the operation of internal-combustion engines on motor fuels, such as gasoline, which develop a fuel knock in the engine when the engine compression exceeds the critical compression pressure of the fuel, and to the use of antiknock compounds like aniline and ethyl iodide which change the burning characteristics of the fuel and prevent the fuel knock at relatively high engine compressions. The highest pressure at which a fuel mixture may be burned in an engine without a fuel knock is called the "critical compression pressure" of the fuel. The presence of a fuel knock may be ascertained by a knocking or pinking sound, and by abnormal heating and loss of power in the engine. In types of motors now in common use, this knock is generally produced when the motor is operating at slow speed under wide open throttle, thus supplying to each cylinder a large quantity of mixture and the compression of this mixture to substantially the maximum compression to which the engine is designed to operate.

It has been proposed to add the antiknock substance to a fuel in the tank of a car and employ the treated fuel through all ranges of operation of the engine. By this method the anti-knock substance is consumed over relatively long periods of operation during which the engine does not operate at a compression at which fuel knocking would occur, especially when the car is being driven in a level country.

The principal objects of the present invention are to provide means controlled by conditions of engine operation for adding the anti-knock substance only at such times as the engine is operating under pressure conditions at which a fuel knock would develop.

Further objects and advantages of the present invention will be apparent from the following description, reference being had to the accompanying drawings wherein preferred forms of embodiments of the present invention are clearly shown.

In the drawings:

Fig. 1 is a longitudinal sectional view taken substantially on the line 1—1 of Fig. 2 of an apparatus embodying the present invention;

Fig. 2 is a plan view thereof;

Fig. 3 is an end view of the apparatus with a part thereof shown in section on the line 3—3 of Fig. 2.

Figure 4:
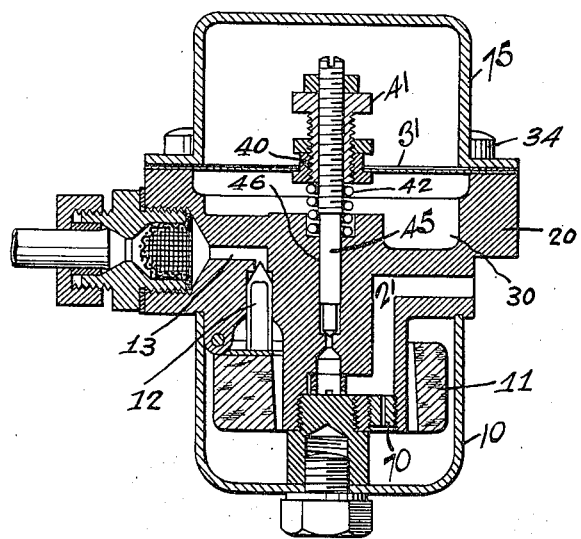
Fig. 4 is a view similar to Fig. 1, of a modified form of the device.

Referring particularly to Fig. 1, the device consists of a bowl 10 provided with a float 11 for controlling the amount of liquid supplied to the device. The float 11 is provided with a needle valve 12 controlling a passageway 13 which leads through suitable connections to the source of supply of the anti-knock material being used.

The bowl 10 is provided with a cover formed preferably of a casting 20 which casting has therein the passage 13 and is also provided with a passage 21 leading from the atmosphere into the device and, through a continuation 22 of said passage, into a threaded opening 23. This threaded opening 23 furnishes means for attachment of a nipple or pipe which is at its other end connected to and communicates with the intake manifold of an internal-combustion engine, (not shown) the connection preferably being made independent of the means (not shown) for feeding the fuel mixture to the manifold. Passage-way 21 is preferably controlled by means of a tapered screw 24 for regulating the amount of air admitted.

The cover 20 is provided in its upper side with a depression or chamber 30 which is in turn covered by a diaphragm 31. Suitable means for attaching the diaphragm to the cover 20, such as ring 32, gasket 33, and screws 34, may be provided.

This diaphragm 31 is provided at its center with a threaded sleeve 40 into which is screwed a nipple 41 bearing at its lower end upon a spring 42. Nipple 41 is internally threaded and coacts with the threaded stem of needle valve 45.

This needle valve 45 extends through the diaphragm and into a suitable bore 46 in the cover member 20. This bore extends into cover member 20 and forms with its lower end a portion of the passage 21. The lower end of the bore 46 is so shaped as to form a valve seat permitting the closing of passage 21 by the valve 45 when in its lowermost position. Also communicating with passage 21 is a small nozzle provided with an opening 50 which communicates with the supply liquid in the float chamber 10.

Chamber 30 is provided with a communication with opening 23 through a small passage-way 60.

The operation of the device is as follows: By means of a short nipple or tube connection with threaded opening 23, the device is placed in communication with the intake manifold of the engine and is also connected through passage 13 and suitable pipes to a convenient source of supply such as a small tank of the liquid material. The spring 42 is then put under a sufficient compression by means of member 41 to balance a sub-atmospheric pressure in chamber 30 of the proper amount, say equal to about eight inches of mercury.

When the engine has been started, suction is produced in chamber 30 and in passage-way 21 and its continuation 22, controlled by screw 24 and valve 45. When the suction produced by the engine equals or exceeds the amount necessary to balance a column of mercury, say of about eight inches, the diaphragm 31 will be drawn inwardly and the valve 45 when properly adjusted will remain seated in the bore 46 thus cutting off inflow of air and anti-knock material.

When however, the suction drops below this predetermined amount, the valve 45 will be lifted by means of the diaphragm 31 and spring 42 and will open passages 21 and 22 permitting air to enter, which entrance will be controlled by adjusting screw 24, causing the air to rush past the upper end of passage-way 50 and carry with it liquid from the float bowl 10 into the engine.

While there has been mentioned above a vacuum of about eight inches of mercury as being necessary in order that the valve may close, it should be understood that this has been mentioned only by way of example. It will be readily noted that by means of nipple 41 the difference in tension between spring 42 and diaphragm 31 may be adjusted to cause valve 45 to open and close at any other degree of vacuum that may be found more desirable. This will necessarily vary with the particular type of engine. The main factor determining the adjustment will, of course, be the vacuum at which the engine ordinarily runs without knocking.

Figure 4 shows a modification of the form of device shown in Figure 1. In this form instead of having the nozzle with opening 50 centered below valve 45, the passage of the liquid from the bowl 10 into passageway 21, is through a small nipple 70 opposite the down-take of passage 21. This permits the ready substitution of differently calibrated nipples or nozzles when such substitution is found advisable, merely by removing bowl 10 and nipple 70 and inserting in the place of the latter a nipple having a different calibration. In this form the valve 45 is merely a shut-off valve, the rate of flow of anti-knock material into the engine, being regulated by the flow of air in passage 21 against the upper end of the passage in nipple 70, and retarding the flow of liquid therethrough. This counter pressure on the liquid in the nozzle varies from a minimum when the engine is running slowly under open throttle and a maximum flow of anti-knock fluid is required, to a maximum pressure when the engine is turning over rapidly with a reduced throttle and the anti-knock substance is not needed.

In this latter form of device also, the regulating screw 24 is omitted, the passage 21 being open to the atmosphere and the flow of air through the passage being regulated by valve 45.

In this form also, the diaphragm 31 and the regulating nipple 41, etc., are shown covered by means of a cap 75.

The operation of this form of device is substantially the same as the operation of the form previously described.

This device, it will readily be seen, will supply the liquid at a rate varying inversely as the suction produced in the engine and becoming zero as the suction increases to and beyond a definite predetermined degree and that the admission of the material will be only at such times as the suction produced in the engine is between the predetermined limits.

In addition to the function of the device as described above it has been found that a more satisfactory operation of the anti-knock material will be accomplished if, when the knock is just beginning, a slug or relatively considerable quantity of the anti-knock material immediately be supplied to the engine, and then the ordinary regular supply made by the device. This slug is supplied by the present device whenever the valve 45 has remained closed for a short period. This is due to the fact that the liquid level in the bowl is somewhat higher than the upper end of passage-way 50 or nipple 70, allowing the accumulation of a small amount of the anti-knock material in passage-way 21. After this accumulation has been made, as soon as the valve 45 opens, this slug will be carried into the engine and thereafter the device will supply the amount for which it has been adjusted. The amount of material supplied as a slug may be regulated by varying any one or more of several factors such as, the level of liquid in the float chamber, the size of the small chamber immediately above the nipple 70 and forming part of passage 21, etc.

While the device in its preferred form has been described as particularly adapted for supplying anti-knock material to internal-combustion engines, it will be obvious that it may be used for supplying other liquids to other devices when the control of the supply is to be accomplished in the same or similar manner by the same or similar conditions.

Further, while the forms of mechanism herein shown and described, constitute preferred forms of embodiment of the present invention, it is to be understood that other forms might be adopted, all coming within the scope of the claims which follow.

What I claim is as follows:

1. The method of operating an internal-combustion engine on a motor fuel which develops a fuel knock at relatively high engine compressions, comprising feeding an anti-knock substance into a fuel mixture at said high engine compressions, and controlling the amount of the substance supplied, by fluid pressure differentials formed by operation of the engine.

2. The method of operating an internal-combustion engine on a motor fuel which develops a fuel knock at relatively high engine compressions, comprising injecting an anti-knock substance into the engine intake only during operation of the engine at high engine compressions, and controlling the range of engine operation during which said injection is made, by vacuum developed by the engine.

3. The method of operating an internal-combustion engine on a motor fuel which develops a fuel knock at relatively high engine compressions, comprising injecting an anti-knock substance into the engine intake only during operation of the engine at high engine compressions, controlling the range of engine operation during which said injection is made, by vacuum developed by the engine, and feeding a relatively large amount of the anti-knock substance into the engine when the injection begins.

4. The method of operating an internal-combustion engine on a motor fuel which develops a fuel knock at relatively high engine compressions, comprising feeding an anti-knock substance into a fuel mixture at said high engine compressions, and controlling the amount of the substance injected by fluid pressure differentials formed by operation of the engine and by fluid pressure directed opposite to the flow of the substance.

5. The combination with an internal-combustion engine and a fuel system therefor; of means controlled by vacuum in the engine intake for feeding an anti-knock substance into the fuel mixture when the engine is operating at relatively high compressions.

6. The combination with an internal-combustion engine and a fuel system therefor; of means controlled by vacuum in the engine intake for feeding an anti-knock substance into the fuel mixture when the engine is operating at relatively high compressions, the said means being inoperative to feed the anti-knock substance when the vacuum developed is relatively high.

7. The combination with an engine having fuel feeding means; of a device for supplying anti-knock material to internal-combustion engines comprising a chamber for containing a body of the material an air passage from the atmosphere to the engine; means for admitting material from the chamber to the passage; and means for regulating the supply of air and material to the engine in inverse ratio to the suction produced therein.

8. The combination with an engine having fuel feeding means; of a device for supplying anti-knock material to an internal-combustion engine comprising a float chamber; a second chamber; a passage from the float chamber to the engine, said passage communicating also with the second chamber; and means operable by change of pressure in the second chamber to control the admission of material from the float chamber into the engine.

9. A device for supplying anti-knock material to an internal-combustion engine comprising a chamber for containing a body of the material; an air passage from the atmosphere into the engine; means for admitting material from the chamber into the passage, said means directing the flow of material against the flow of air in said passage; and means for allowing the admission of air and material into the engine when the suction produced by the engine is between predetermined limits.

10. A device for supplying anti-knock material to an internal-combustion engine comprising a bowl forming a float chamber; a cover for the bowl having therein a passage from the outside air into the engine; a second passage communicating with the first mentioned passage and with the float bowl, the two passages being so arranged as to cause the air entering the first to carry along with it anti-knock material from the float bowl; and means operable by the suction produced in the engine to allow the admission of air and anti-knock material when the suction produced in the engine is between predetermined limits.

11. A device for supplying anti-knock material to an internal-combustion engine comprising a bowl forming a float chamber; a cover for the bowl having therein a passage from the outside air into a conduit leading to the engine; a second passage communicating with the first mentioned passage and with the float bowl, the two passages being so arranged as to cause the air entering the first to carry along with it anti-knock material from the float bowl; and means operable by the suction produced in the engine to control the admission of air and material through the passages, the said means comprising a second chamber having one flexible wall, the wall carrying a valve controlling the before-mentioned passage-ways, the valve being normally held open but adapted to be closed by a decrease in pressure in the second chamber.

In testimony whereof I hereto affix my signature.

FRED E. ASELTINE.

Witnesses:
 LEE EMRICK,
 ALVINA C. LEHMAN.